United States Patent
Vitkus et al.

(10) Patent No.: US 9,224,287 B2
(45) Date of Patent: *Dec. 29, 2015

(54) DOOR AJAR DETECTION AND RECOVERY FOR A WIRELESS DOOR SENSOR

(71) Applicants: Invensys Systems, Inc., Carol Stream, IL (US); Thermo King Corporation, Minneapolis, MN (US)

(72) Inventors: Kimble Allyn Vitkus, Sycamore, IL (US); Stephen Michael Pasek, Bartlett, IL (US); Mark Alan Johnson, Wheaton, IL (US); Russell Lee Sanders, Minnetonka, MN (US); Mark Daniel Leasure, Eagan, MN (US)

(73) Assignee: Invensys Systems, Inc., Foxboro, MA (US)

( * ) Notice: Subject to any disclaimer, the term of this patent is extended or adjusted under 35 U.S.C. 154(b) by 414 days.

This patent is subject to a terminal disclaimer.

(21) Appl. No.: 13/709,385

(22) Filed: Dec. 10, 2012

(65) Prior Publication Data

US 2013/0252552 A1    Sep. 26, 2013

Related U.S. Application Data

(60) Provisional application No. 61/613,963, filed on Mar. 21, 2012.

(51) Int. Cl.

| H04B 7/00 | (2006.01) |
|---|---|
| G08C 15/04 | (2006.01) |
| H04W 4/00 | (2009.01) |
| H04W 4/20 | (2009.01) |
| H04Q 9/00 | (2006.01) |
| H04W 52/02 | (2009.01) |

(52) U.S. Cl.
CPC .............. *G08C 15/04* (2013.01); *H04Q 9/00* (2013.01); *H04W 4/008* (2013.01); *H04W 4/206* (2013.01); *H04Q 2209/43* (2013.01); *H04Q 2209/883* (2013.01); *H04W 52/0219* (2013.01)

(58) Field of Classification Search
CPC ................... H04Q 2209/43; H04Q 2209/883; H04W 4/008
USPC .................. 455/41.2, 41.3; 62/207; 340/545.6
See application file for complete search history.

(56) References Cited

U.S. PATENT DOCUMENTS

| 5,924,289 A * | 7/1999 | Bishop, II | ............... | F25B 21/04 |
| | | | | 62/3.61 |
| 7,636,340 B2 * | 12/2009 | Black et al. | ............ | G01D 21/00 |
| | | | | 348/158 |
| 7,970,871 B2 * | 6/2011 | Ewing | .................... | G01D 21/00 |
| | | | | 702/104 |
| 8,086,352 B1 * | 12/2011 | Elliott | ................. | F24F 11/0009 |
| | | | | 700/275 |
| 2013/0252550 A1 * | 9/2013 | Johnson et al. | ............... | 455/41.2 |

* cited by examiner

*Primary Examiner* — Eugene Yun
(74) *Attorney, Agent, or Firm* — Thomas J. Roth, Esq.

(57) ABSTRACT

A refrigerated container system is described that includes a wireless personal area network (WPAN) including a plurality of wireless sensor nodes and a coordinator node through which the sensors provide sensor data to a controller for the refrigerated container system. The wireless sensors and the coordinator incorporate a variety of features that ensure efficient utilization of battery life by preventing unintended pairing of sensors with other WPANs and excessive sensor signal processing arising from door chatter. Finally, pairing is performed without pressing a button on the wireless door sensor. Instead, the sensor's magnetic reed switch is enlisted to detect swiping of a magnet by a user to enter a pairing mode.

9 Claims, 8 Drawing Sheets

DOOR AJAR DETECTION AND RECOVERY FOR A WIRELESS DOOR SENSOR

CROSS-REFERENCE TO RELATED APPLICATIONS

This application claims the priority benefit of Johnson et al., U.S. Provisional Patent Application Ser. No. 61/613,963, filed on Mar. 21, 2012, entitled "Refrigerated Container System Including Wireless Sensor Personal Area Network," the contents of which are expressly incorporated herein by reference in their entirety, including any references therein.

This application relates to Johnson et al., U.S. patent application Ser. No. 13/709,380, filed on Dec. 7, 2012, entitled "A Means for Pairing a Hermetically Sealed Wireless Device," the contents of which are expressly incorporated herein by reference in their entirety, including any references therein.

This application relates to Johnson et al., U.S. patent application Ser. No. 13/709,356, filed on Dec. 7, 2012, entitled "Wireless Device Pairing Recovery," the contents of which are expressly incorporated herein by reference in their entirety, including any references therein.

This application relates to Johnson et al., U.S. patent application Ser. No. 13/709,371, filed on Dec. 7, 2012, entitled "RF4CE for Automotive and Industrial Environments," the contents of which are expressly incorporated herein by reference in their entirety, including any references therein.

This application relates to Johnson et al., U.S. patent application Ser. No. 13/709,348, filed on Dec. 7, 2012, entitled "," the contents of which are expressly incorporated herein by reference in their entirety, including any references therein.

TECHNICAL FIELD

This patent disclosure relates generally to a transportable refrigerated container system (also known as a "reefer"), and more particularly, a refrigerated container system including a controller and a set of wireless sensors communicating over a short range wireless network.

BACKGROUND

Generally, refrigerated container systems facilitate transporting cargo in a cooled state to maintain a particular desired quality while the cargo is transported to intended destinations. The cargo is transported, stored, or otherwise supported within a cargo space of the transport container, and is maintained at a desired temperature within the cargo space using a transport refrigeration system.

A control unit typically provides automated monitoring and control of the status and operation of a refrigerated container system. For example, the control unit regulates the temperature of a cargo space within the container by turning a refrigeration unit on/off based on sensed temperature and a setpoint temperature. The control unit is also capable of sensing other conditions relating to the cargo space of the refrigerated container system. One such condition is the open/closed state of one or more doors provided on the refrigerated container for accessing the cargo.

The desirability of having a network of sensors in a refrigerated container system, both temperature and door state, is clear. However, incorporating wireless door sensors into control networks for refrigerated containers presents unique challenges that are described and addressed herein.

SUMMARY OF THE INVENTION

The disclosure describes several aspects of managing a wireless personal area network (WPAN) incorporated within a refrigerated container system.

In a first aspect, a method, performed by a wireless sensor node, is described for pairing a wireless sensor including a switch with a coordinator in a wireless personal area network. The method includes first sensing actuation of the switch according to a first actuation sequence timing requirement. The first sensing must then be followed by second sensing no actuation of the switch, for a first designated waiting period commencing after the first sensing has ended and then third sensing actuation of the switch according to a second actuation sequence timing requirement after the second sensing. The wireless sensor enters a pairing mode with the coordinator only after completing at least the third sensing step.

In a second aspect, a method, performed by a wireless sensor node, is described for actively purging, without operator intervention, coordinator entries from a pairing table for a wireless sensor incorporated into a wireless personal area network. The method comprises registering a failure by the wireless sensor to connect to a first coordinator identified in the pairing table. A second coordinator is identified in the pairing table. A determination is then made that the wireless sensor has repeatedly failed to connect to the coordinator a specified number of times over a period of time. Then the first coordinator is purged from the pairing table in response to the identifying and determining steps.

In a third aspect, a mobile container system is describes that includes a cargo containment space. The system further includes a controller monitors and maintains conditions of a space within the cargo container. The container system also includes a wireless personal area network (WPAN) comprising: a set of wireless sensor nodes that generate, for the controller, status information relating to the cargo container, and a coordinator node that receives, on behalf of the controller, the status information via wireless connections to paired ones of the set of sensor nodes. The WPAN enables the set of sensors to provide the status information for use by the controller via the coordinator node.

In a fourth aspect, a method is described for managing a wireless door sensor to avoid excessive sensor signal processing arising from a chattering door sensor signal stream. The method comprises detecting, by the wireless door sensor, a specified number of door transitions within a specified time period. In response to said detecting the following further steps are performed: (1) disabling a door signal transition event processing routine; (2) enabling a timer-based door sensor signal processing routine, wherein the timer-based routine reads a door sensor signal status regardless of whether a door signal transition has occurred, and (3) re-enabling the door signal transition event processing routine in response to reading a same value for the door sensor signal status multiple times over a time duration. The multiple readings indicate the door position has stabilized.

In a fifth aspect, a method, performed by a coordinator node, is described for preventing inadvertent pairing of a sensor device with the coordinator in a WPAN network incorporated into a refrigerated container system. The method comprises: (1) extracting a property value from a pairing request message provided by the sensor device to the coordinator; (2) comparing the property value to expected property values for sensor devices in the wireless personal area network; and (3) conditionally allowing, by the coordinator, pairing with the sensor based upon the comparing step.

BRIEF DESCRIPTION OF THE DRAWINGS

While the appended claims set forth the features of the present invention with particularity, the invention and its advantages are best understood from the following detailed description taken in conjunction with the accompanying drawings, of which:

DETAILED DESCRIPTION OF THE DRAWINGS

Figure 1:
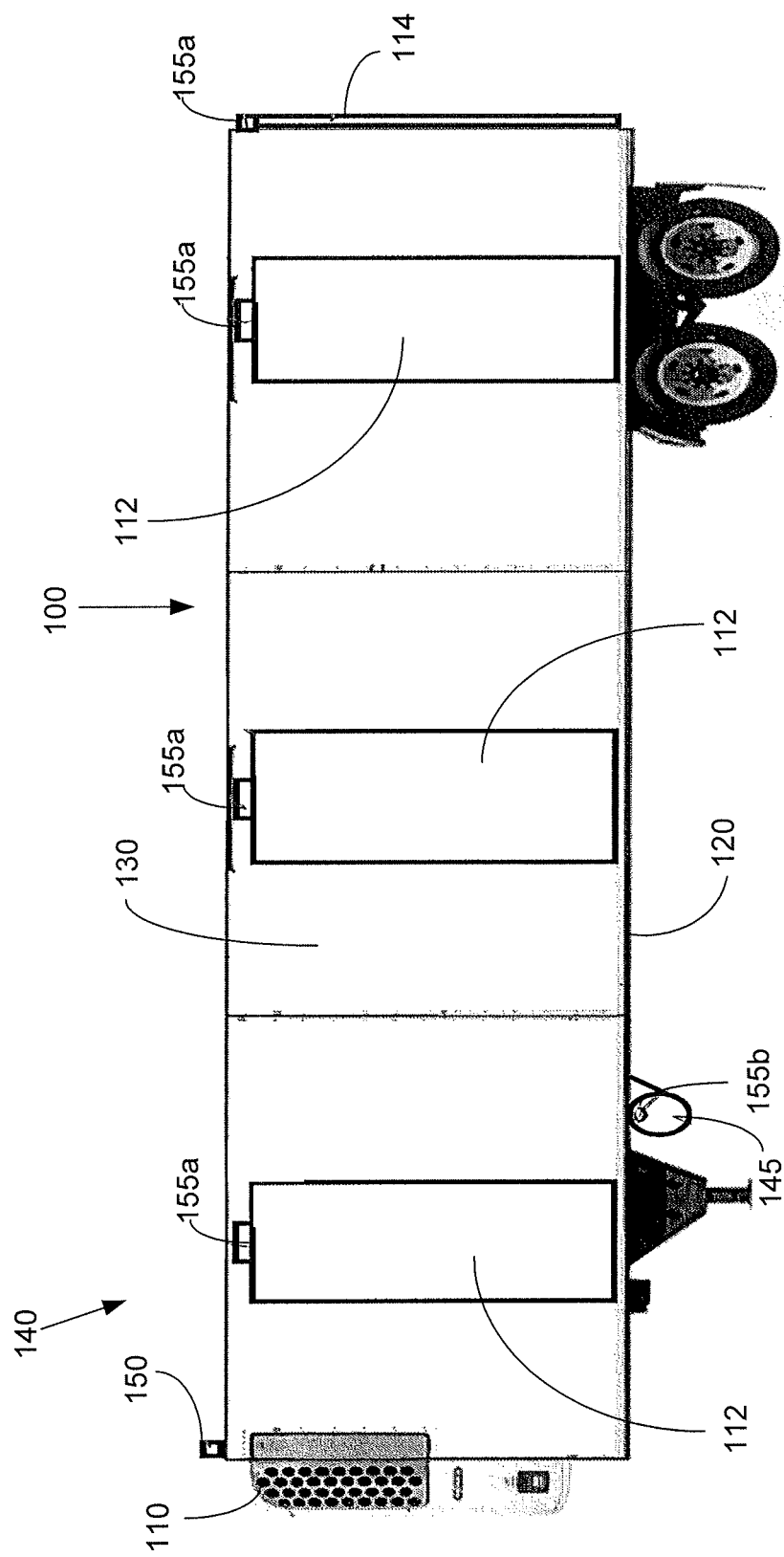
FIG. 1, is a side view of a trailer having an integrated refrigeration system in accordance with the disclosure.

Turning initially to FIG. 1, a side view is provided of a trailer unit 100 with a transport refrigeration system 110. The trailer unit 100 is installed on a frame 120 and has a plurality of side doors 112 and a rear door 114. The transport refrigeration system 110 is installed on a side wall of the trailer unit 100. The transport refrigeration system 110 is configured to transfer heat between an internal space 130 and the outside environment.

It will be appreciated that the embodiments described herein are not limited to trucks and trailer units. The embodiments described herein are used in any other suitable temperature controlled container systems. The refrigeration system 110 is, for example, a vapor-compressor type refrigeration system, or any other suitable refrigeration system.

The transport refrigeration system 110 includes a wireless communication system 140 (see FIG. 2) and a fuel tank 145. The wireless communication system 140, described herein below with reference to FIG. 2, includes a controller (not shown), an antenna 150, and a plurality of wireless end nodes 155. As shown in FIG. 1, the wireless end nodes 155 include a door sensor 155a for each of the side doors 112 and the rear door 114, and a fuel tank level sensor 155b for the fuel tank 145. The wireless end nodes 155, in other systems, include other types of sensors such as, for example, an air space temperature sensor, a humidity sensor, a cargo temperature sensor, accelerometer, etc. Also, the wireless end nodes 155 are hermetically sealed to prevent water and contaminant ingress. The wireless communication system 140 is configured to enable the wireless end nodes 155 to communicate information regarding the monitored status of the refrigerated container system, incorporated into the trailer unit 100, to a controller unit (not shown) of the transport refrigeration system 110 for controlling the heating, ventilation and air conditioning ("HVAC") of the internal space 130.

Figure 2:
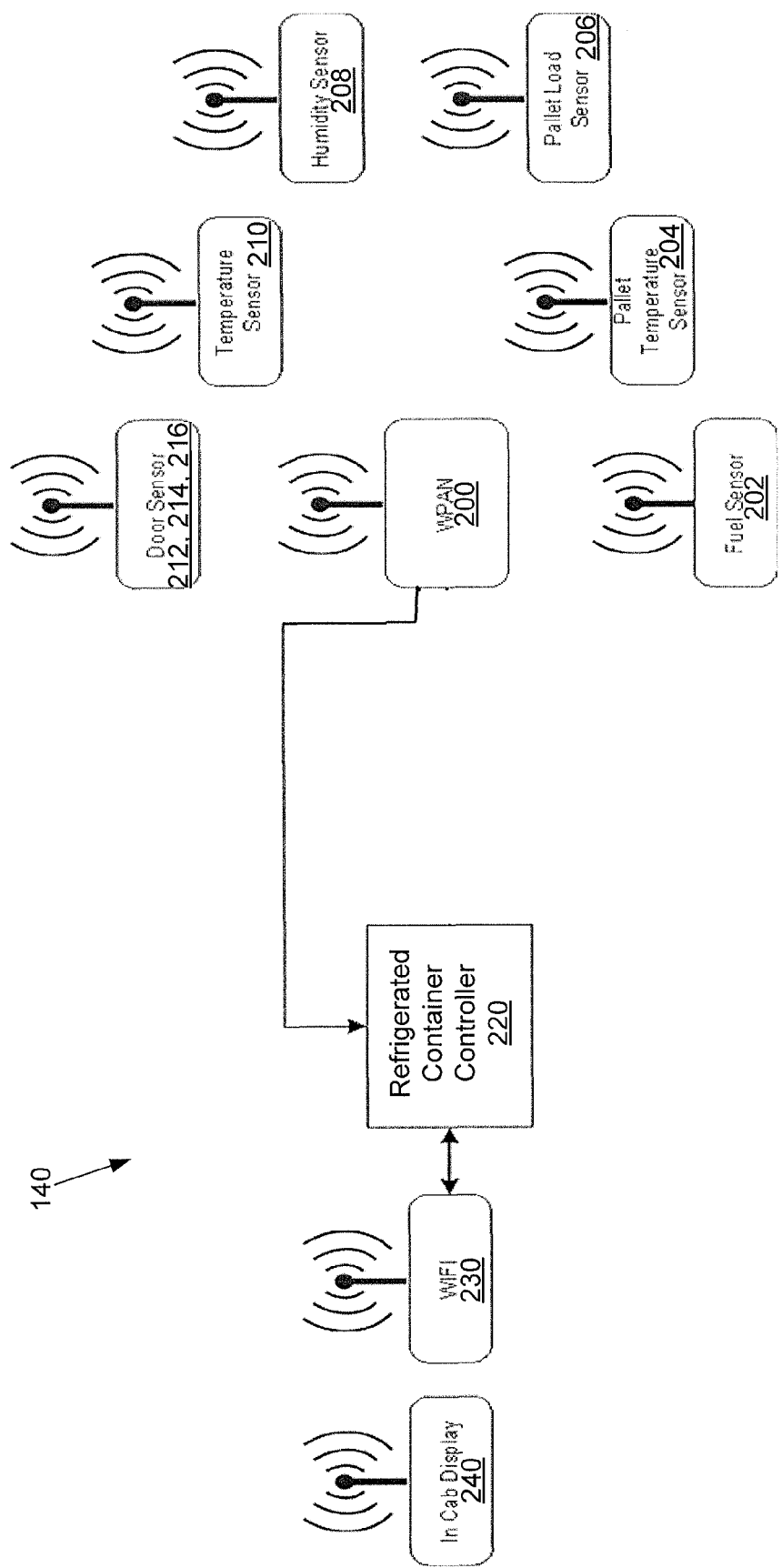
FIG. 2 is a schematic diagram of an exemplary wireless personal area network (WPAN) for wireless communication between a controller and a plurality of wireless sensor-transmitters in accordance with the disclosure.

Turning to FIG. 2, the wireless communication system 140 incorporates, by way of example, an exemplary wireless personal area network (WPAN) for wireless communication between a controller and a plurality of sensors including wireless transceivers. In the particular illustrative network depicted in FIG. 2, a WPAN coordinator node 200 communicates wirelessly with a plurality of previously paired wireless sensor nodes including a fuel sensor 202, pallet temperature sensor 204, pallet load sensor 206, humidity sensor 208, temperature sensor 210, side door sensors 212, 214, and back door sensor 216.

By way of example, the WPAN coordinator node 200 includes, among other things, an external antenna to support sufficient communication range for communicating with remotely located sensor/transceivers in the WPAN positioned on a refrigerated transport container/vehicle such as the one depicted in FIG. 1. The coordinator node 200 is also equipped with a pairing mode button and status LEDs for pairing with and thereafter visually indicating the status of paired sensor nodes within the WPAN.

The sensor nodes are generally equipped with function-specific sensor hardware, a data interface between the sensor and a controller/processor within the sensor module, and a transceiver for communicating status information with the coordinator node 200 (after pairing). A particular example of a door sensor assembly is described herein below with reference to FIGS. 4A and 4B.

The coordinator node 200 is connected via a wired interface to a refrigerated container controller 220. The refrigerated container controller 220 is communicatively coupled to a Wi-Fi modem/transceiver 230. The Wi-Fi modem/transceiver 230 provides, by way of example, a wireless connection to the Internet through which the refrigerated container controller 220 communicates with a variety of resources. The WPAN depicted in FIG. 3 also includes a wirelessly linked display 240 providing in-cab information relating to the status of the refrigerated container system based upon status information provided by the coordinator node 200. The coordinator node 200, incorporating RF4CE communication protocols (see below), has full WPAN coordinator capabilities and can start a WPAN in on its own initiative for pairing and then communicating with the plurality of sensor nodes in the illustrative network.

While other communication protocols are indeed contemplated, in an exemplary embodiment, the wirelessly communicating nodes of FIG. 2 incorporate the ZIGBEE RF4CE protocol. The following are general characteristics of communications via ZIGBEE RF4CE:

1. Based on the 2.4 GHz PHY/MAC IEEE 802.15.4 standard.

2. Thin, flexible and future-proof networking layer is thin, flexible.

3. Co-existence with other 2.4 GHz technologies is built-in through techniques defined in the IEEE 802.15.4 standard and ZIGBEE RF4CE's advanced channel agility mechanism.

4. A simple and intuitive pairing mechanism defined for establishing communication links.

5. Support for multiple communication types.

6. Power management mechanism included in network layer for power efficient implementations.

7. The standard ensures that ZIGBEE RF4CE implementations will co-exist.

8. The ZIGBEE RF4CE specification allows for both public application profiles and manufacturer specific profiles or transactions.

9. Support for different applications through application layer profiles ensuring device interoperability.

The following provides a technical summary of the ZIGBEE RF4CE wireless communication protocol specification. The ZIGBEE RF4CE specification defines a simple, robust and low-cost communication network supporting wireless connectivity in a WPAN environment. The ZIGBEE RF4CE specification enhances the functionality of the IEEE 802.15.4 standard by providing a simple networking layer and ZIGBEE Alliance developed public application profiles that can be used to create multi-vendor interoperable solutions for use within WPANs. Some of the characteristics of a ZIGBEE RF4CE network are as follows: operation in the 2.4 GHz frequency band according to IEEE 802.15.4, channel agile solution operating over three channels, incorporates a power management mechanism for all device classes, incorporates a discovery mechanism with full application confirmation, provides a pairing mechanism with full application confirmation, supports multiple star network topology with inter-PAN communication, various transmission options (e.g., uni-cast, broadcast, acknowledged, and unacknowledged, secured and un-secured), provides security key generation mechanism, utilizes an industry standard AES-128 security scheme, supports extensions for adding manufacturer specific profiles.

With regard to network topology, an RF4CE WPAN is composed of two types of devices (WPAN nodes): a target device and a controller device. A target device has full WPAN coordinator capabilities and can start a network on its own initiative. A controller device can join networks started by target devices by performing a pairing operation with a target device. Multiple RF4CE WPANs can form a RF4CE network and devices in the network can communicate between RF4CE WPANs. After pairing, to communicate with a target, a controller (e.g., sensor node in FIG. 2) first switches to the channel and assumes the WPAN identifier of the destination RF4CE WPAN. The controller (e.g., sensor node) then uses the network address assigned to the controller, previously allocated to the controller during pairing with the target, to identify itself on the RF4CE WPAN.

The RF4CE architecture is defined in terms of blocks and layers to simplify specification of the protocol. Consistent with other communication protocol specifications, each layer of the RF4CE architecture is responsible for one part of the specification, offers services to a next higher layer and utilizes services from the next lower layer. The interfaces between the layers serve to define the logical links that are described herein below. The layout of the layers is based on the open systems interconnection (OSI) seven-layer model. The RF4CE specification is built onto the IEEE 802.15.4 standard MAC and PHY layers and provides networking functionality and public application profiles which can interface to the end user application. Manufacturer-specific extensions to public application profiles are defined by sending vendor specific data frames within the profile. In addition, manufacturer-specific profiles can also be defined.

The RF4CE network layer provides two services: (1) the network layer data service, interfacing to the network layer data entity (NLDE) and (2) the network layer management service, interfacing to the network layer management entity (NLME). These services are accessed through the network layer data entity SAP (NLDE-SAP) and the network layer management entity SAP (NLME-SAP). The network layer data service enables transmitting and receiving network protocol data units (NPDUs) across the MAC data service. The network layer management service permits service discovery, pairing, unpairing, receiver control, device initialization and NIB attribute manipulation.

RF4CE devices operate in the 2.4 GHz frequency band, as specified by IEEE 802.15.4. However, to provide robust service against other common sources of interference in this band, only a small subset of channels (3 total) is used—channels 15, 20 and 25. A target device can choose to start its network on the best available channel at startup time, and so an RF4CE network may operate over one or more of the three specified channels.

RF4CE devices support channel agility across all three permitted channels. As described above, a target device (e.g., coordinator node 200 in FIG. 2) selects its own initial channel, based on the channel conditions during startup. During the course of the life of the target device, channel interference may necessitate switching to another channel to maintain a high quality of signal/service. Each controller device paired to the target records the channel on which communication is expected. If the target switches to another channel, the controller device can attempt transmission on one of the two other channels to reacquire communications. The last channel upon which the controller communicated with the target is stored in the controller (sensor) node for a next communication attempt.

Each RF4CE device initializes according to whether the device is a target or a controller device. A controller (e.g., a sensor transceiver) device configures the stack according to the RF4CE standard and starts operating normally. A target (e.g., coordinator node 200 in FIG. 2) device configures the stack and then attempts to start a new WPAN. The target device first performs an energy detection scan that allows it to obtain information on usage of each one of the three available channels, thereby allowing the target device to select a suitable channel on which to initially operate. The target device then performs an active scan allowing the target device to determine the identifiers of any other IEEE 802.15.4 WPANs operating on the selected channel, thus allowing a unique WPAN identifier to be selected for the new WPAN corresponding to the initializing target device. The target device (e.g., coordinator node 200) then begins operating normally.

RF4CE incorporates power saving features that allow both controller devices and target devices to manage power consumption by entering a power saving mode. The power saving mechanism is under the control of each public application profile. A device can manipulate its receiver in a number of ways: the receiver can be enabled until further notice, the receiver can be enabled for a finite period, and the receiver can be disabled until further notice. When the power saving mode is engaged, the receiver is enabled for an application defined duration (known as the active period) and then disabled. This mechanism is then repeated at an application-defined interval (known as the duty cycle). Other devices can still communicate with a device in power saving mode by targeting the transmission during the active period. The result is a device that periodically enables its receiver for only a short time, allowing it to conserve power while remaining active on the network.

Figure 3:
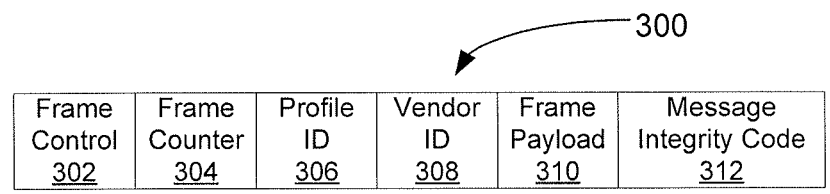
FIG. 3 is an exemplary frame definition for messages transmitted by sensor-transmitters in accordance with the disclosure.

Turning to FIG. 3, the RF4CE network layer defines three frame types: standard data, network command and vendor specific data. Standard data frames transport application data from public application profiles. Network command frames transport frames that allow the network layer to accomplish certain tasks such as discovery or pairing. Vendor specific data frames transport vendor specific application data.

The fields of the general network frame 300 format are identified in FIG. 3. A Frame control field 302 contains control information for the frame. A Frame counter field 304 contains an incrementing counter to detect duplicate frames and prevent replay attacks (security). A Profile identifier field 306 specifies an application frame format being transported in the frame. A Vendor identifier field 308 specifies a value allowing vendor extensions. A Frame payload field 310 contains the application frame data. A Message integrity code 312 contains a value to provide authentication (security).

The RF4CE specification defines a number of transmission options that can be used by an application and combined as appropriate. Each transmission can be sent in a secured or un-secured mode. A transmission can be sent in Acknowledged mode wherein the originator data is confirmed by the recipient. In Unacknowledged mode the originator data is not confirmed by the recipient. In Unicast mode the originator data is sent to a specific identified recipient. In Broadcast mode the originator data is sent to all recipients for reception and processing. In Multiple channel mode the originator attempts transmission using a frequency re-acquisition mechanism. In Single channel mode the originator attempts transmission on the expected channel.

With regard to discovery of other devices (nodes), a device (e.g., coordinator 200 or sensor nodes) performs discovery in an attempt to find other suitable devices to which the device can pair. Discovery can be attempted repeatedly on all three channels for a fixed duration or until a sufficient number of responses have been received. Service discovery is only available to devices that are not currently in power saving mode. During discovery, a number of pieces of information are exchanged between devices. Upon receipt by a node, the discovery information is passed to the application layer which decides whether to respond.

During discovery devices exchange the following information:

Device capabilities: The type of the device (i.e. target or controller), whether the device is externally or battery powered, and level of security.

Vendor information: The RF4CE allocated vendor identifier and a freeform vendor string specifying vendor specific identification (e.g. a serial number).

Application information: A short user defined string which describes the application functionality of the device (e.g. "door sensor"), a device type list specifying which types of device are supported (e.g. a coordinator may list the types of sensors with which it communicates), and a profile identifier list specifying which application profiles are supported by the device (e.g. a public application profile or a manufacturer specific profile).

Requested device type: The type of device being requested through the discovery (e.g. a sensor may be in search of a coordinator and vice versa).

Pairing is an important aspect of devices in an RF4CE WPAN. Once a suitable device is located through discovery, a pairing link is established to enable communication between the two devices. Nodes within an RF4CE network only communicate directly with other devices on the network if a pairing link exists.

A pairing link can be established on request from the application layer by exchanging a similar set of information as was exchanged during node discovery. The application on the target (e.g., coordinator 200) decides whether to accept the pairing request and confirm the pairing request back to the controller (e.g., sensor). Upon successful pairing, both devices store a pairing link in their respective pairing tables. This allows an originator controller to communicate with a target and the target to communicate back to the originator controller. Each entry in the pairing table of the controller contains all the information necessary for the network layer to transmit a frame to the target device. This removes the burden of addressing, etc. from the application layer which can simply supply an index into the pairing table of the controller in order to communicate with another (target) device.

In accordance with the RF4CE protocol, each entry in the pairing table (see, FIG. 6, pairing table entry 600) contains the following information: Pairing reference, Source network address, Destination logical channel, Destination IEEE address, Destination WPAN identifier, Destination network address, Recipient device capabilities, Recipient frame counter, and Security link key.

Security is an important aspect of many network communications. The RF4CE specification includes a cryptographic mechanism to protect transmissions between devices. The security specification includes the following security services:

Data confidentiality: ensuring that transmitted data is disclosed only to the intended recipient.

Data authenticity: ensuring that the intended recipient of a ZIGBEE RF4CE transmission knows that the data was sent from a trusted source and not modified during transmission.

Replay protection: ensuring that a secure transmission cannot simply be repeated by an attacking device if overheard.

128-bit cryptographic keys are generated by each device of a pairing link and stored in the pairing table for future use.

Turning to the Application layer of the RF4CE, the application layer is composed of a profile component and an application specific component. The profile is the common aspect of a language that devices implementing the same profile exchange to accomplish certain tasks, and allows for interoperability between devices. The application component is provided by end manufacturers to add specific functionality to the commands specified through the profile. The RF4CE specification defines Alliance developed public application profiles, but also permits vendors to extend public application profiles and to define completely proprietary profiles.

In the particular implementation of RF4CE for carrying out the sensor network for a refrigerated container system depicted in FIG. 2, several features of the specification are exploited. Frequency agility is used by the coordinator 200 and sensors to avoid interference in mobile environments prone to highly variable noise interference. Battery life in the sensor nodes is extended by the specified hibernation mode which can reduce power consumption to, for example, 1 to 10 microamps. The WPAN range specified for RF4CE nodes are generally within the ranges required for refrigeration container systems (with extenders available).

Figure 4A:
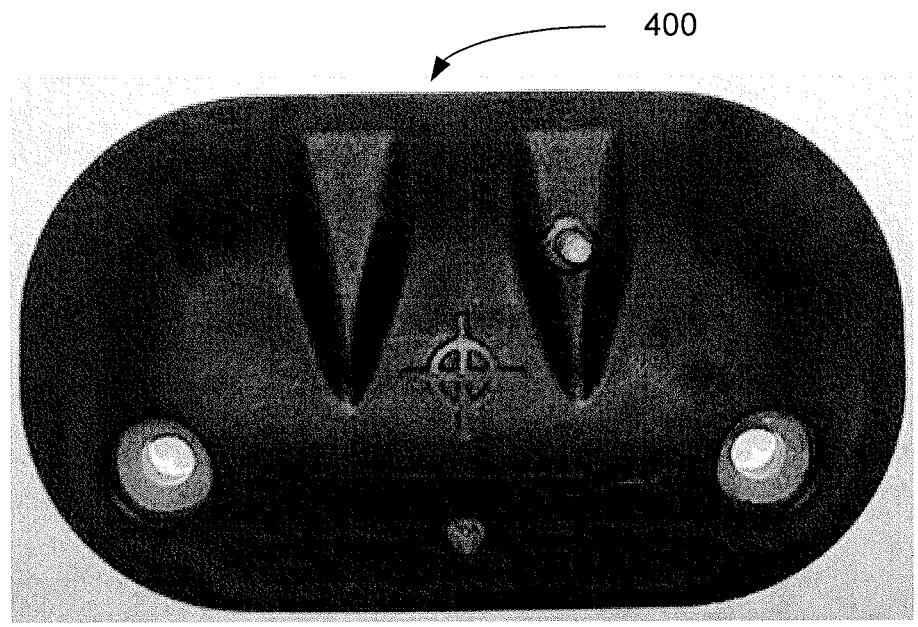
FIGS. 4A and 4B depict an exemplary door sensor module (4A) and magnet (4B) in accordance with the disclosure.
Figure 4B:
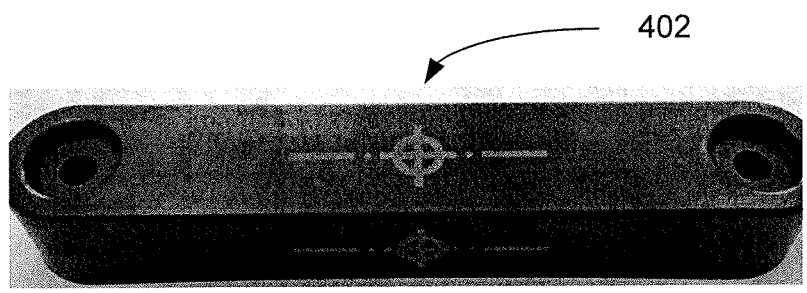

Having generally described an exemplary network environment for the refrigerator control system incorporating WPAN communication network, attention is directed FIGS. 4A and 4B that depict an exemplary door sensor assembly (e.g., door sensors 212, 214 and 216). The door sensor assembly includes a sensor and transceiver component 400 and a permanent magnet component 402. The permanent magnet component 402 is simply an encapsulated permanent magnet with suitable physical features to facilitate attachment to a container.

The sensor and transceiver component 400 includes, by way of example, a magnetic reed switch coupled to a data interface of an embedded controller. The sensor and transceiver component 400 also includes transceiver electronics and a battery for powering the sensor and transceiver component 400 electronics. As noted above, the sensor and transceiver component 400 incorporates the RF4CE specification for communication as a controller device with a paired target (coordinator 200) in a WPAN. The sensor and transceiver component 400 incorporates the battery power saving aspects of RF4CE described herein above as well as back-off algorithms after several failed communications attempts to achieve an intended battery life of several (e.g., 5 years) under normal usage. The sensor and transceiver component 400 is also equipped with a set of LEDs for indicating status. By way of example, a green LED indicates good communications status, a yellow LED indicates lost communications, and a red LED indicates a low battery. In the exemplary embodiment, the reed switch and permanent magnet are configured to have an actuation distance of about 2 inches (actuated when the door is closed).

The presence of a reed switch within the sensor and transceiver component 400 provides a basis for configuring the component 400 with specification layer computer-executable instructions to support initiation of a pairing mode in the component 400 by swiping a magnet within the detection range (e.g., 2 inches) of the component 400 containing the reed switch. This mode of pairing enables activation of a pairing mode without use of a typical physically actuated pairing button. Thus, the sensor and transceiver component 400 can be manufactured as a hermetically sealed (encapsulated) module resistant to moisture and dust. It is noted that other magnetically actuated switches are contemplated in place of the reed switch including Hall Effect and Giant Magneto Resistive sensors.

Given the dual use of the reed switch for sensing door state (indicated as closed when brought within actuation range of the permanent magnet component 402) and initiating pairing mode operation with the coordinator node 200, the sensor and transceiver component 400 is configured at an application layer to recognize a particular magnet wave/swipe timing sequence/pattern for entering the pairing mode. The configured wave/swipe timing sequence/pattern (described herein below with reference to FIG. 5) ensures that opening and closing the door to which the sensor is assigned, does not unintentionally initiate the pairing mode operation of the sensor and transceiver component 400.

Figure 5:
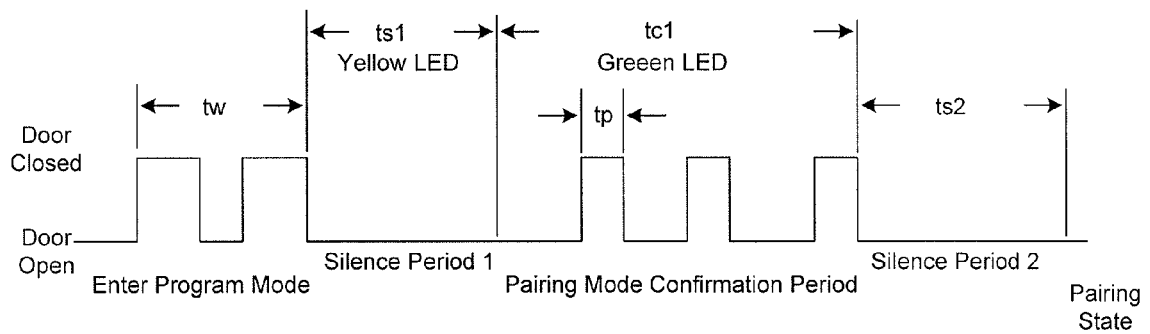
FIG. 5 is a sequence diagram summarizing stages for performing a sequence of magnet swipes detected by a magnetically sensitive component, such as a reed switch, to initiate pairing between a sensor device and a coordinator in a WPAN in accordance with the disclosure.

Turning to FIG. 5, an exemplary timing pattern is shown for initiating (i.e., causing entry into) the pairing mode of operation for the component 400. In general, a pairing mode initiation sequence is defined by a sequence of timed magnet swipes (pulses, including signal rise/fall combinations) and wait periods. The magnet swipes and wait periods fall within a limited overall time span or spans sufficiently long to distinguish the intentionally performed sequence from random door chatter or other user actions that could lead to unintended entry into the pairing mode. Referring to the sequence diagram in FIG. 5, a low logical signal state corresponds to when the magnetic reed switch is open (i.e., no magnet is within range), and a high logical signal state corresponds to when the reed switch is closed (i.e., a magnet is within range).

Referring to FIG. 5, the pairing state initiation sequence begins with a magnet swipe that is unlikely to arise under normal operating conditions involving a person opening/closing/opening a door containing a complementary magnet component (e.g., permanent magnet component 402). By way of example, during an "Enter Program Mode" stage, a magnet is "waved" twice across the component 400 thereby creating two logical signal pulses having a total elapsed time (tw) of at least 800 msec. from the first signal pulse rise to the fall of the second pulse. Alternatively, the Enter Program Mode stage is defined by a single, sufficiently slow wave of a magnet within, and then out of, range of the sensor of the component 400 to cause a signal pulse having a duration of at least 300 msec.

Longer or shorter times can be chosen for either the two or single pulse alternatives signaling the first stage of a sequence for entering a pairing state in the sensor and transceiver component 400. However, too short of a time will potentially cause confusion with a door chatter movement.

Continuing the description of the illustrative pairing state initiation sequence, the falling edge of the signal, marking the end of the Enter Program Mode stage, marks a beginning of a Silence Period 1 stage having a duration (ts1). During the Silence Period 1 stage there is no reed switch activation. The duration of the Silence Period 1 stage is, for example, 2 seconds. However, other silence periods can be specified (e.g., greater periods of silence).

A Pairing Mode Confirmation Period stage commences immediately upon completing the mandated wait period (e.g., 2 seconds) for the Silence Period 1 stage. During the Pairing Mode Confirmation Period stage a designated quantity of swipes (waves of a magnet within range of the switch within the component 400) are completed during an elapsed confirmation period having a duration (tc1) that meets a prescribed time limit (e.g., 10 seconds). In the illustrative example, three swipes of a magnet—each swipe (pulse) having a duration (tp) of at least 300 msec. (to be counted)—must be completed within the prescribed time limit to complete the Pairing Mode Confirmation Period stage. Alternatively, more or fewer magnet swipes are required (e.g., 2 swipes, 4 swipes) to complete this stage. After the user performs the three required swipes within the prescribed (10 second) time period, the pairing mode initiation sequence mandates completion of a second silence period (ts2)—Silence Period 2—having a duration of, for example, at least 2 seconds. Upon completing the Silence Period 2 stage, the component 400 initiates pairing with the coordinator 200 for the WPAN.

Moreover, in a further enhancement to the above-described pairing mode initiation procedure, the various stages of the pairing state initiation sequence are visually indicated by the component 400, for example, using various colored light-emitting diodes (LEDs). The LEDs (e.g., green, yellow and red) are employed to guide a user through the various stages of the pairing mode initiation sequence. For example, during the Silence Period 1 stage and Silence Period 2 stage, a yellow LED flashes for the duration of the stage—an indication to the user to use caution to ensure that a magnet field source does not enter the range of the component 400's magnetic field sensor (e.g., reed switch). Thereafter, during the Pairing Mode Confirmation Period, a green LED flashes to indicate when the user should commence/perform a series of (three) confirmatory magnet swipes. For, example, the multiple swipe Pairing Mode Confirmation Period stage is successfully completed when the series of LED flashes is followed by corresponding swipes within a designated period. Furthermore, another LED signal pattern indicates when pairing mode is initiated at the end of the sequence depicted in FIG. 5 and when the pairing of the controller 400 with the coordinator 200 is successfully completed. There are, of course, many different patterns that can be used to ensure that pairing is limited to intended occasions. The above example, and other suitable sequences, balances the need to avoid unintended pairing attempts and making the sequence sufficiently brief/simple to ensure user compliance.

Figure 6:
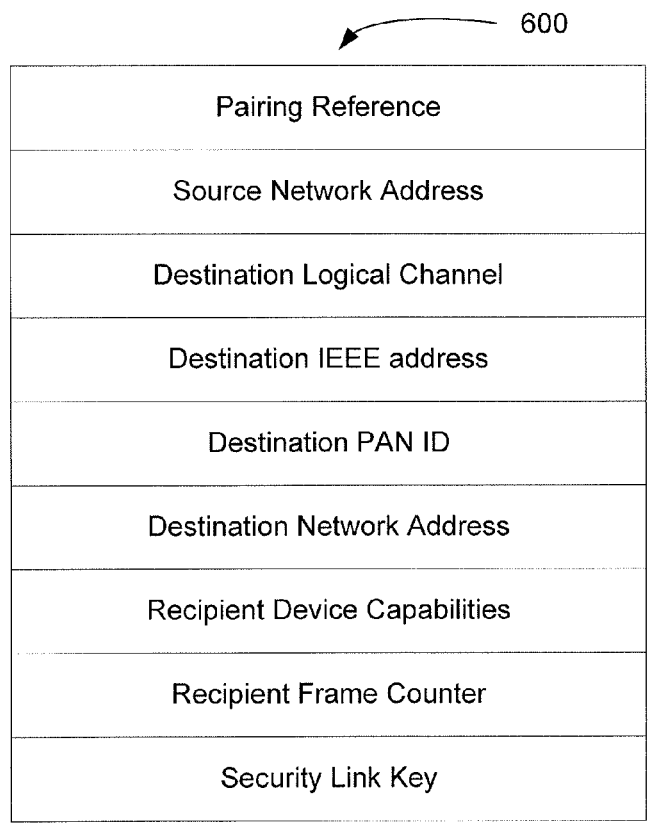
FIG. 6 is a paired device registration table entry format in accordance with the RF4CE specification.

Another aspect of pairing a sensor node with a coordinator node in a WPAN environment is the unintended pairing of a sensor with multiple coordinators. In the context of refrigerated container systems, such unintended pairing arises when a sensor is paired while in a depot containing several other coordinators that are capable of pairing with the sensor. The unintentionally paired coordinator (target device) eventually leaves the vicinity of the sensor, yet the inadvertently entered entry remains in the sensor's pairing table (see e.g., FIG. 6, pairing table entry 600). The pairing table entry fields identified in FIG. 6 are known to those familiar with the ZIGBEE RF4CE standard, and thus will not be described in detail herein since the point of the current disclosure is to identify a suitable environment for carrying out the pairing table cleaning method described herein. Furthermore, while such extra pairing table entry (or entries) is easily accommodated in the plentiful memory space of the sensor's controller electronics, the presence of the additional entry potentially results in unnecessary wireless message transmissions by a sensor node in search of a coordinator that is no longer in range. Such searching imposes an unnecessary and excessive drain on the sensor's battery power, thereby potentially substantially shortening the sensor node battery lifespan. Another source of unwanted pairing table entries arises from replacement of previously paired (malfunctioning) coordinator (target device) by a new coordinator. In such case, when the new target device is paired and a new pairing table entry is created, the old pairing table entry remains in the pairing table of the sensor node.

Figure 7A:
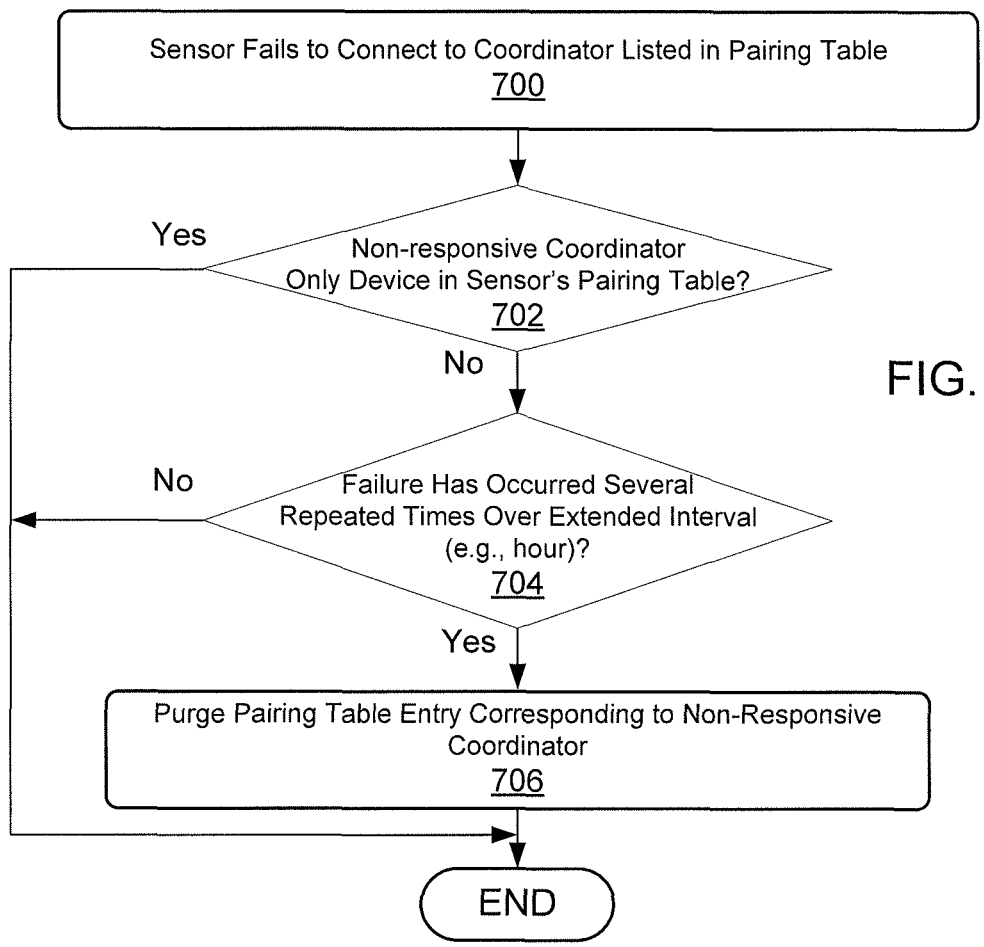
FIG. 7A is a flowchart summarizing steps carried out in a device to remove erroneous pairing table entries in accordance with the disclosure.

A method is described, with reference to FIG. 7A, for clearing erroneous pairing table entries from RF4CE WPAN devices without user intervention. The method relies upon additional logic relating to a connection process whereby a sensor establishes a connection to a coordination listed in the pairing table of the sensor implementing the RF4CE WPAN protocol. During step 700, a sensor (controller device), such as the door sensor 212 in FIG. 2, encounters a failure to establish a connection "event" with a coordinator (target device) to which the sensor had previously paired. Such failure to connect with a coordinator listed within the sensor's pairing table can arise under any of several circumstances, including: the temporary shutdown of the coordinator, the failure/replacement of the coordinator, or the inadvertent pairing with a nearby foreign WPAN (described above) when the sensor device was initially paired with its intended coordinator (e.g., coordinator 200).

Thereafter, during step 702, the sensor determines whether the non-responding coordinator is the only device identified in the sensor's pairing table. If the non-responding coordinator is the only entry, then control passes to the End. Such event is possibly just a temporarily non-responsive coordinator. Step 702 is inserted as a failsafe to ensure that the sensor maintains at least one entry in the sensor's pairing table. However, if more than one entry is present in the pairing table, then control passes from step 702 to step 704.

At step 704 the sensor repeatedly attempts to establish a connection with the non-responsive coordinator over an extended period (e.g., an hour). If at any point the sensor is able to establish a connection, then control passes to the END. However, if the failures to connect continue repeatedly for the duration of the multiple re-tries over the extended period, then control passes to step 706 wherein the sensor purges the entry corresponding to the non-responsive coordinator from the sensor's pairing table. Control then passes from step 706 to the END. As such, a self-healing procedure is provided for both instances described above when a previously paired coordinator is no longer part of an intended WPAN to which a sensor belongs.

A failure detection definition implemented during step 704 differs in accordance with various exemplary embodiments. In one particular example failure is noted when 50 repeated connection attempt failures are recorded for the sensor during a period of four hours. The frequency of attempts can vary over the maximum wait period before a final connection failure is established during step 704. In yet another example, the sensor executes a tiered failure approach wherein each tier specifies a different combination of wait period (between connection attempts) and total number of attempts. In a particular example of a tiered failure approach, a frequency of attempts decreases (i.e., a wait period between attempts increases) and the total number of failed attempts (before moving to a next connection failure tier) decreases. Even more particularly, the tier number itself is used to exponentially increase the wait (e.g., double the wait period between attempts for each tier increase) and exponentially decrease the total number of attempts (e.g., halve the number of attempts) for each tier. This approach has the advantage of covering a wider variety of potential "temporary" failures while ensuring that truly erroneous table entries are eventually purged from the table—potentially after a several day wait—to accommodate a situation such as maintenance operations that are disrupted over a weekend.

Figure 7B:
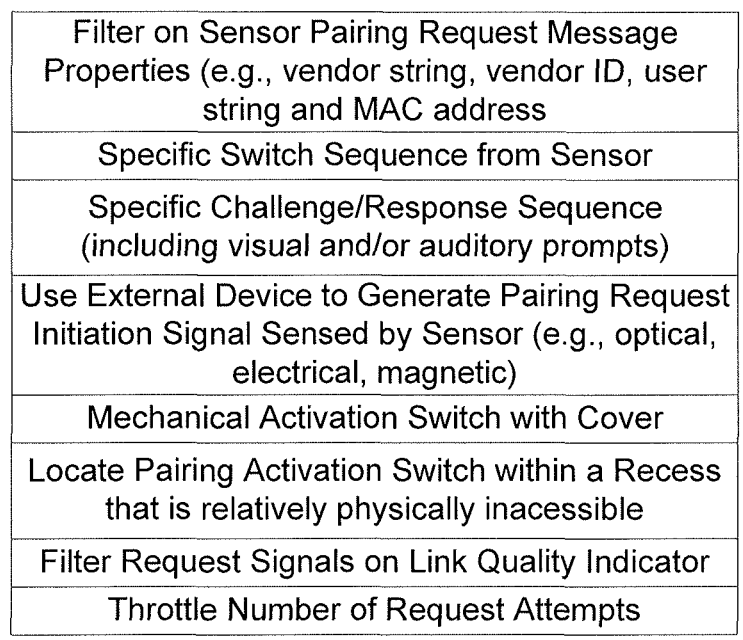
FIG. 7B summarizes a set of measures incorporated into pairing logic implemented by a coordinator node to ensure against unintended/improper pairing with a sensor.
Figure 7C:
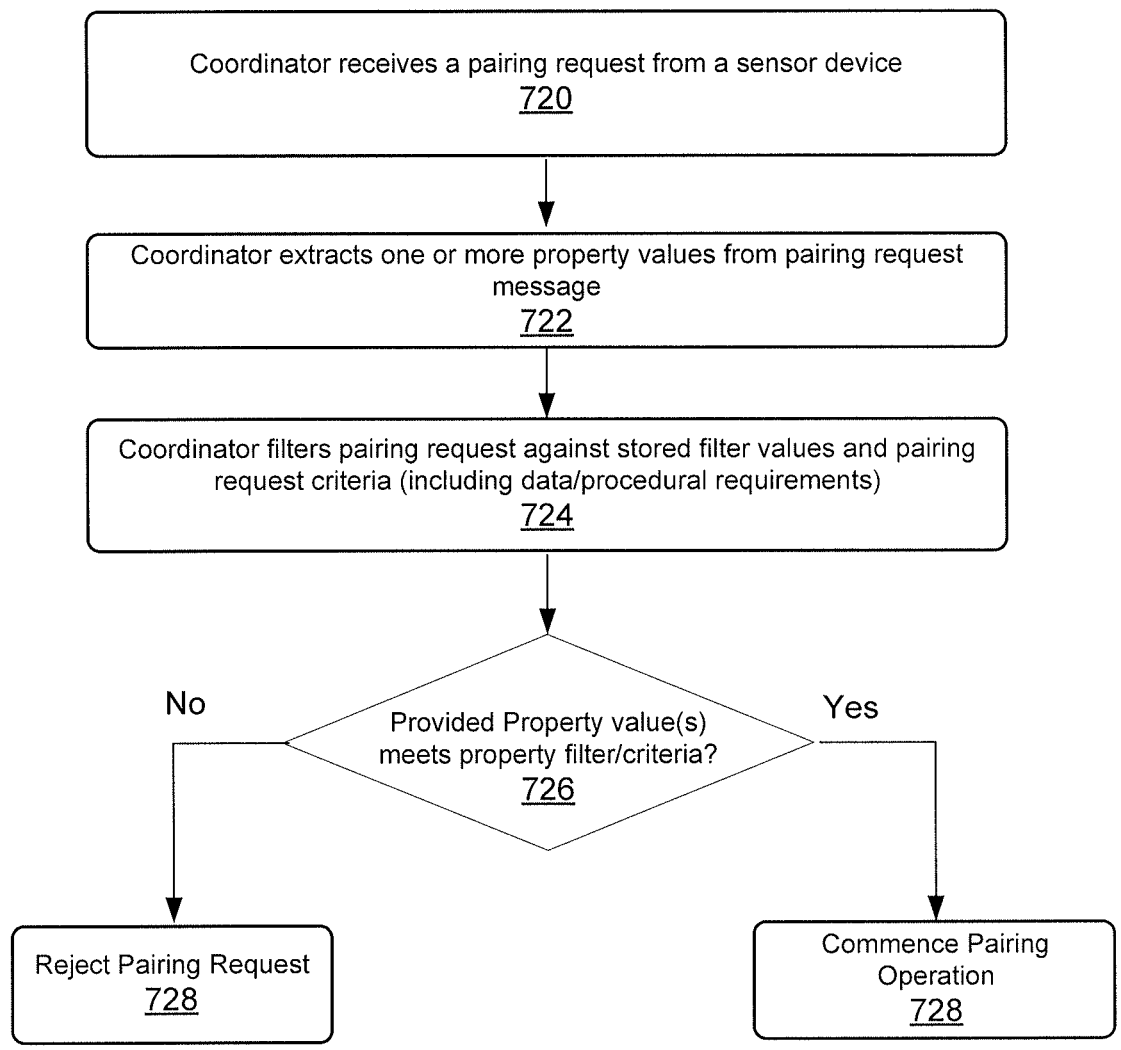
FIG. 7C is a flowchart summarizing steps carried out on a coordinator node to ensure against unintended pairing with a wireless node.

Similarly, with reference to FIGS. 7B and 7C, steps can be taken at the coordinator 200 to ensure against improper pairing of a sensor (controller device) from another refrigerated container system in an area proximate the coordinator. Referring to the summarized operation of the coordinator, during step 720 the coordinator node receives a pairing request message from a sensor node seeking to pair with the coordinator node in a WPAN. The pairing request message contains a wealth of information that can be used to filter requests. Moreover, various timing/signal strength/query-response requirements can be imposed on top of the basic message format requirements. Such requirements, imposed by the coordinator prior to allowing a pairing operation are discussed herein below.

During step 722 the coordinator extracts one or more property values from the pairing request message. Such extraction can include the aforementioned measures relating to message information as well as the time/signal strength/query-response requirements mentioned herein.

During step 724 the coordinator filters the pairing request information extracted during step 722 against stored filter values and pairing request criteria (including data/procedural requirements). Control then passes to step 726.

During step 726, responsive to the test(s) applied during step 724, if the provided property value(s) meet a property filter/pairing criteria, then control passes to step 728 wherein the coordinator commences operations for pairing with the requesting wireless sensor node. Otherwise, if the provided property value(s) and/or some other property filter/pairing criteria are not met, then control passes from step 726 to step 729 wherein the pairing request is rejected through either explicit response or passive non-response by the coordinator node.

By way of example, and with reference to FIG. 7B, during step 724 the coordinator 200 utilizes detailed knowledge of the properties of a specific wireless network to prevent inappropriate pairing requests. In a first manner of preventing improper pairing, identified in the table of FIG. 7B, the coordinator 200 filters requests based upon properties identified in the pairing request from a sensor. Such properties include: vendor string, vendor ID, user string, and MAC address (e.g., apply address to an expected range or the Organizationally Unique Identifier contained in first 3 bytes of the MAC address). Yet other application level requirements are incorporated into the coordinator 200's pairing protocols that require, for example:

1. A particular switch sequence from the requesting sensor.

2. A challenge-response sequence with visual or auditory prompts to determine with high confidence that a person is activating the switch and it is not an accidental occurrence.

3. Use of an external device as a tool to generate a pairing request signal which would be detected by a sensor device via optical, electrical or magnetic communication.

4. Use a mechanical switch cover to prevent accidental pressing.

5. Locate the pairing button within a recess that cannot easily be reached.

Link quality indication (LQI) is also used by the coordinator 200 to reject week signals from likely distant sources that are not intended members of the coordinator 200's WPAN. Still another way to lessen the chance of inadvertent pairing is for the coordinator 200 to monitor a quantity of commissioning attempts over time, and throttle excessive pairing attempts arising from non-intended or inappropriate use of a pairing button. The throttling is intended to reduce a probability that random switch activations on a sensor node will initiate a pairing request with one or more coordinator nodes within the vicinity of the sensor node. Moreover, the above-described tools used by a coordinator 200 to prevent unintentional pairing between closely situated container systems or other WPANs, can be combined such that one or all of the above potential methods are used to block unintended pairings.

Figure 9:
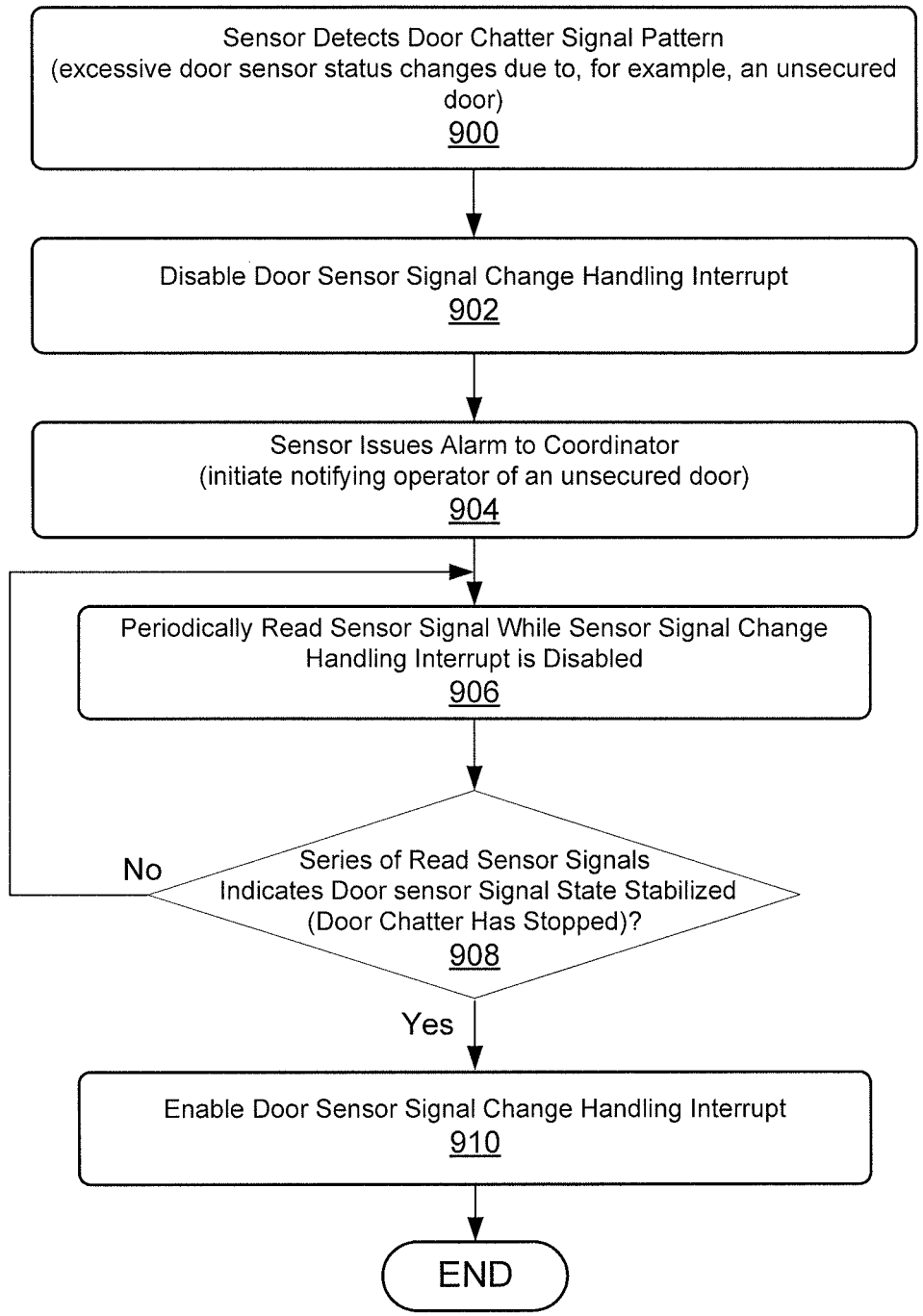
FIG. 9 is a flowchart summarizing a set of steps for selectively disabling/enabling a door sensor signal interrupt handling routine in response to door chatter condition detection.

Yet another potential draw upon a sensor's limited battery power supply is excessive signal processing occurring due to door chatter arising from, for example, an improperly secured door. Such situations result in transient open/close door signals being registered. In each instance where the door opens sufficiently, an interrupt issues and the sensor wakes up to register and report the event. To avoid unnecessary waking up of the door sensor (e.g., door sensor 212), a procedure is implemented by logic executed within the sensor electronics. The logic, summarized in FIG. 9, causes the sensor to disable sensor interrupt (and associated routine) during step 902 after detecting excessive door chatter during step 900 (i.e., a number of door status changes within a time period that exceeds a specified limit. Disabling the sensor interrupt causes the sensor electronics to ignore the door signal by temporarily preventing executing the sensor interrupt routine when the sensor changes state. Moreover, during step 904 the sensor issues a notification message (alarm) to the coordinator that, in turn, signals the operator to attend to the door that is causing the unstable (chattering) sensor signal.

Thereafter, during step 906 the sensor electronics periodically monitor the door status (under control of a watchdog timer that expires every minute while awaiting a determination that the door sensor status has reached a stable open/closed state. During step 908, if the sensor electronics determine that the signal stabilized at a constant open or closed status for a period of time (as evidenced by the door signal state registered upon expiration of the watchdog timer during a period while the sensor interrupt is disabled) then control passes to step 910. During step 910 the door sensor signal interrupt is enabled to resume normal sensor signal operation. Otherwise, if during step 908 the periodic reading of the sensor signal over a period of time indicates that the sensor state has not stabilized, then control returns to step 906.

Figure 8A:
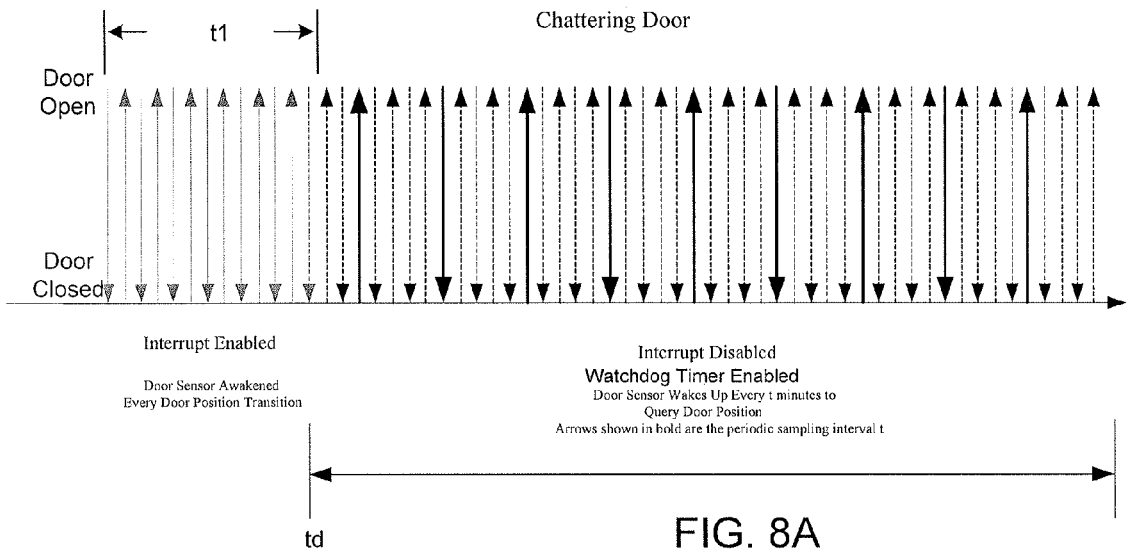
FIGS. 8A and 8B are state diagrams representing the registered status of a door sensor (open/closed) over time when the door is chattering.
Figure 8B:
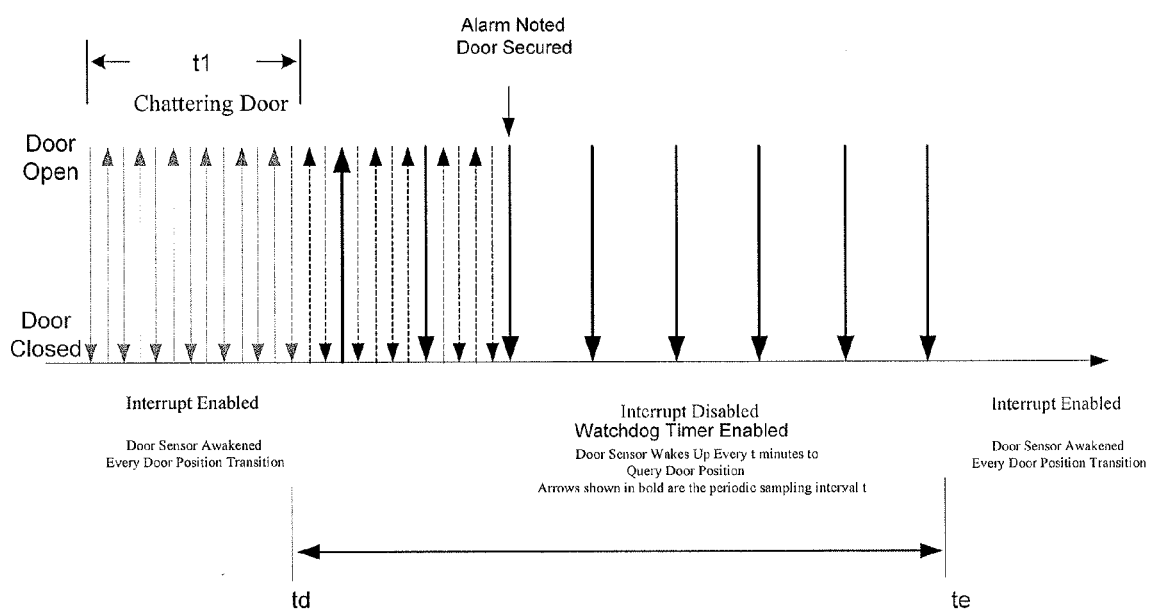

Turning to FIGS. 8A and 8B, exemplary timing diagrams depict the actual signal sensed by the door sensor (e.g., door sensor 212) during operation of the refrigerated container system. In FIG. 8A, a door is chattering and is not secured. The chatter signal, as indicated by the direction of the arrows, causes the sensor to repeatedly wake, observe the door status, and issue a message to the coordinator at least 20 times (by way of example) during a period of time period t1 that is less than a specified time window (e.g., 5 minutes). After the sensor interrupt is activated the twentieth time during the period of time t1 (less than for example 5 minutes), at time td, a power saving feature causes the sensor to disable the sensor event interrupt. Thus, the sensor electronics ignore the frequent open/close door event signal for the remainder of the sequence depicted in FIG. 8A. However, after time t1 (e.g., after the twentieth transition in under 5 minutes), the door sensor enables a watchdog timer that wakes up the sensor electronics every minute (or other configured wait period) to monitor the status of the door status signal (shown by the vertical up/down arrows). The sensor readings that are actually processed by the sensor (upon expiration of the watchdog timer) are indicated by the bold arrows. The dashed arrows indicate sensor transitions that are not processed by the sensor electronics.

A second feature of a door chatter signal handling scheme implemented by the sensor electronics relates to recovery from the state where the sensor interrupt is disabled (and the watchdog is enabled). As noted above, when the sensor interrupt is disabled, an alarm message is forwarded by the coordinator to a controller that, in turn, issues an alarm to an operator. In FIG. 8B, the door is subsequently secured (in response to the alarm). However, the sensor electronics do not immediately enable the door status interrupt. Instead, the watchdog timer interrupt remains enabled for a period of time wherein the door sensor signal status is read once every minute (or other configured wait period). After periodically waking up (under watchdog timer notification) and reading a same door sensor status value (e.g., closed) multiple times (e.g., 7 times) over several minutes, the sensor electronics re-enable the previously disabled door sensor interrupt (at time to in FIG. 8B) and disable the watchdog timer. At this point, the interrupts are operating in the normal operational state.

Embodiments of the invention are described herein. Variations of those embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A method of managing a wireless door sensor to avoid excessive sensor signal processing arising from a chattering door sensor signal stream, the method comprising:
   detecting, by the wireless door sensor, a specified number of door transitions within a specified time period, and in response to said detecting:
      disabling a door signal transition event processing routine;
      enabling a timer-based door sensor signal processing routine, wherein the timer-based routine reads a door sensor signal status regardless of whether a door signal transition has occurred, and
      re-enabling the door signal transition event processing routine in response to reading a same value for the door sensor signal status multiple times over a time duration, such multiple readings being indicative of the door position being stabilized.

2. The method of claim 1 wherein the wireless door sensor is a wireless sensor node within a wireless personal area network (WPAN).

3. The method of claim 2 wherein the WPAN is incorporated into a transportable refrigerated container system ("reefer").

4. The method of claim 2 wherein the wireless personal area network implements communication between a coordinator and the wireless sensor node according to a ZIGBEE RF4CE wireless personal area network communication protocol.

5. The method of claim 1 wherein wireless door sensor includes a switch.

6. The method of claim 5 wherein the switch is a magnetic switch.

7. A wireless door sensor node for incorporation into a wireless personal area network, the wireless door sensor node including:
   a switch facilitating generating a door sensor status signal;
   a processor; and
   a non-transitory computer readable medium including computer-executable instructions, executable by the processor, for managing the wireless door sensor node to avoid excessive sensor signal processing arising from a chattering door sensor signal stream, the method comprising:
      detecting, by the wireless door sensor, a specified number of door transitions within a specified time period, and in response to said detecting:
         disabling a door signal transition event processing routine,
         enabling a timer-based door sensor signal processing routine, wherein the timer-based routine reads a door sensor signal status regardless of whether a door signal transition has occurred, and
         re-enabling the door signal transition event processing routine in response to reading a same value for the door sensor signal status multiple times over a time duration, such multiple readings being indicative of the door position being stabilized.

8. The wireless sensor node of claim 7 wherein the sensor is configured to sense a change in magnetic field in response to a change in an open/closed status of a door.

9. A transportable refrigerated container system including:
   a refrigeration system including a controller;
   a wireless communication system configured as a wireless personal area network (WPAN), the WPAN comprising:
      a wireless sensor node, configured to sense a status of a door in the refrigeration system and communicate the status of the door to a second node within the WPAN, the wireless sensor node comprising:
         a switch facilitating generating a sensor status signal indicating the status of the door;
         a processor; and
         a non-transitory computer readable medium including computer-executable instructions, executable by the processor, for managing the wireless door sensor node to avoid excessive sensor signal processing arising from a chattering door sensor signal stream, the method comprising:
            detecting, by the wireless door sensor, a specified number of door transitions within a specified time period, and in response to said detecting:
               disabling a door signal transition event processing routine,
               enabling a timer-based door sensor signal processing routine, wherein the timer-based routine reads a door sensor signal status regardless of whether a door signal transition has occurred, and
   re-enabling the door signal transition event processing routine in response to reading a same value for the door sensor signal status multiple times over a time duration, such multiple readings being indicative of the door position being stabilized.

\* \* \* \* \*